United States Patent Office 3,561,891
Patented Feb. 9, 1971

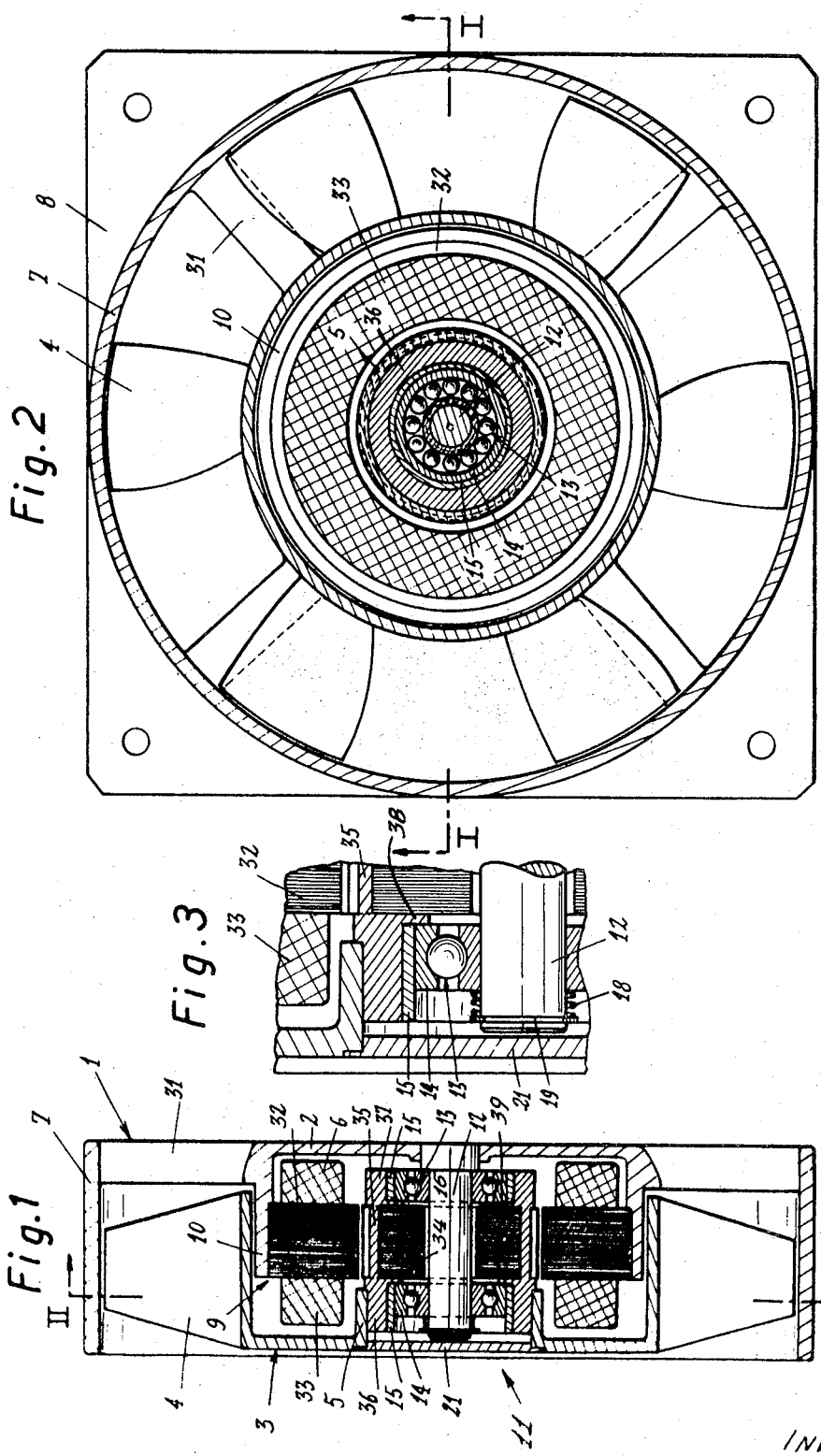

3,561,891
AXIAL FANS, ESPECIALLY FOR ELECTRONIC APPLICATIONS
Henri Saint-Amand, Neuilley-sur-Seine, France, assignor to Etudes Techniques et Representations Industrielles, a company
Filed Mar. 14, 1969, Ser. No. 807,221
Claims priority, application France, Mar. 29, 1968, 146,329
Int. Cl. F04d 25/06
U.S. Cl. 417—353      8 Claims

ABSTRACT OF THE DISCLOSURE

An electric axial fan of the flat type intended primarily for cooling electrical appliances and comprising a casing within which the fan impeller is rotatably mounted and which carries the stator of a squirrel-cage induction motor and a forcibly inserted shaft for supporting by means of ball-bearings the rotor of the motor which drives the fan impeller. The rotor cage is provided on each side of its magnetic circuit with two laterally projecting short-circuit collars and the ball-bearings are fitted between said collars and the shaft of the fan casing.

---

Preferably, the short-circuit collar which is located on the side remote from the fan casing is adapted to accommodate the inner annular flange of the impeller at the periphery of said collar.

The present invention is concerned with improvements to electric fans of the axial-flow or propeller type which are primarily intended to be fitted in electronic devices for cooling purposes.

Fans of this type are required to satisfy three essential criteria: minimum axial dimensions, a long service life and a cost price which nevertheless remains as low as possible.

Extra-flat axial fans which are intended for this application are already known and usually consist of a simple casing whose periphery serves as a housing for the fan impeller and performs the function of an air diffuser. The stator of a squirrel-cage induction motor is housed inside said fan casing. A shaft is fixed in the axis of the casing by being forcibly fitted in this latter and is intended by means of ball-bearings to support the squirrel-cage rotor of said motor to which the impeller hub is directly attached. Said shaft is mounted in overhung position and thus dispenses with the end-shield which supports the other extremity of the shaft in a normal motor. The result thereby achieved is a substantial reduction in the thickness of the motor, the stator and rotor which are reduced to the general configuration of a thick disc.

Motors of the type just referred-to are nevertheless subject to the following technical and economic disadvantages.

In the first place, the ball-bearings are usually fitted within a tube, the central portion of which passes through the magnetic circuit of the rotor. The bore which is necessary for the insertion of said tube reduces the iron cross-section of the rotor and consequently lowers the performance of the motor. In order to mitigate this drawback, it is found necessary not only to reduce the diameter of the bearings to a substantial extent which is achieved only at the cost of an unfortunate reduction both in the reserves of lubricant and in the service life of the fan, but also to reduce the diameter of the stationary shaft whose strength and rigidity are consequently impaired.

In the second place, the tube which is fitted with the ball-bearings, the balls themselves which are of extremely small size as well as the shaft of small diameter which carries said bearings are expensive to produce and this results in a further increase in the capital cost of the fan.

The aim of the present invention is to overcome the disadvantages which have been outlined in the foregoing.

In accordance with the invention, the electric axial fan of the flat type intended primarily for electronic applications and comprising a casing within which the fan impeller is rotatably mounted and which carries the stator of a squirrel-cage induction motor and a forcibly inserted shaft which supports by means of ball-bearings the rotor of the motor which drives the fan impeller, is characterized in that the rotor cage is provided on each side of its magnetic circuit with two laterally projecting short-circuit collars and that the ball-bearings are fitted between said collars and the shaft of the fan casing.

In an advantageous embodiment of the invention, the short-circuit collar which is located on the side remote from the fan casing is adapted to accommodate the internal annular flange of the impeller at the periphery of said collar.

According to another property of the invention, the calibrated metallic annular bushings which are coaxial with the rotor and have an internal diameter which is slightly larger than the external diameter of the ball-bearings are disposed within the short-circuit collars which are formed of aluminum, for example. These calibrated annular bushings are advantageously inserted in the short-circuit collars at the time of casting of these latter and subsequently serve as supports for the outer rings of the ball-bearings. Excessive shrinkage of the short-circuit collars after casting is thus prevented and the volume of said collars is small.

In a preferred embodiment of the invention, the outer ball-bearing rings are bonded to the internal faces of the projecting collars of the rotor. This makes it possible by means of the clearance provided between collars and outer bearing-rings to correct any slight axial misalignment of the two short-circuit collars and to avoid the need for machining of these latter. As a further preferred arrangement, the adhesive which is employed for this purpose is a synthetic product which polymerizes only out of contact with air, that is to say within the space which is left free between the collar and the outer ball-bearing ring.

Further properties of the invention will become apparent from the detailed description which now follows, reference being made to the accompanying drawings which are given by way of non-limitative example and in which:

FIG. 1 is a view of the fan in elevation and in axial cross-section along the line I—I of FIG. 2;

FIG. 2 is a front view of the fan in elevation and in partial cross-section along the line II—II of FIG. 1;

FIG. 3 is a view which is similar to FIG. 1 on a larger scale and showing the assembly of ball-bearings in detail.

Referring to FIGS. 1 and 2, there is shown at 1 the fan provided with a protective casing 2 and an impeller or impeller-wheel 3 with peripheral blades 4 which is driven in rotation by means of an inner annular flange 5, said flange being secured to the rotor of an electric motor 6 which is housed within the central portion of the fan casing 2. The said casing is provided with a peripheral annular flange 7 which is braced by radial spacer members 31 and said members are in turn applied against an inner flange 10 of the casing 2. The peripheral flange 7 is integral with a frame 8 which serves to fix the fan on any suitable wall of the enclosure to be cooled. The blades 4 of the impeller 3 are adapted to rotate within the annular passageway which is formed between the casing flanges 7 and 10.

The motor 6 which drives the fan 1 (FIG. 1) is of the induction type in the example under consideration. Said motor comprises a stator 9, the magnetic circuit 32 of which is attached to the internal face of the casing flange 10. The ends of the stator winding 33 are connected to a terminal plate (not shown in the figure) which is fixed to the fan casing 2. The motor 6 also comprises a rotor 11 of the short-circuited type which is driven in rotation about a stationary shaft 12 which is press-fitted in the protective fan casing 2.

The stationary shaft 12 is accordingly fitted in the vicinity of the shaft ends with ball-bearings 13 which support the rotor 11 of the motor 6.

The rotor 11 is provided with a central magnetic circuit 34 placed in immediate proximity to the shaft 12 and with a squirrel-cage 35, the ends of which are short-circuited by two substantially projecting collars 36, 37 which are cast in one piece with the cage and formed, for example, of cast aluminum or any like metal which has good conductivity. The inner annular flange 5 of the impeller is fitted over the external peripheral portion of the short-circuit collar 36 which is located on the side remote from the fan casing 2 and the impeller is thus driven in rotation by the rotor 11 of the motor 6.

In accordance with the present invention, the collars 36 and 37 serve to secure the outer rings 14 of the ball-bearings 13.

To this end, in the preferred embodiment herein described, carefully calibrated coaxial metallic annular bushings 15 are fitted within the internal peripheral portions of the short-circuit collars 36, 37. Said bushings have an internal diameter which is slightly larger than the external diameter of the outer bearing-rings and a thickness which makes them practically non-deformable at the moment of casting of the rotor cage 35 and collars 36, 37. This prevents any substantial shrinkage of the molten metal inasmuch as the use of metallic annular bushings 15 of appreciable thickness permits a corresponding reduction in the thickness of the short-circuit collars 36, 37.

The adhesive which is employed between the calibrated bushings 15 on the one hand and the outer rings 14 of the ball-bearings 13 on the other hand is preferably a synthetic adhesive which polymerizes only out of contact with air or in the case under consideration, between the adjacent annular components which it is desired to bond together. An adhesive of this type is well known per se.

The ball-bearings 13 which support the rotor 11 of the driving motor 6 as well as the impeller 3 of the fan 1 are secured in the transverse direction by means of an annular shoulder 16 formed on the stationary shaft 12 on the same side as the fan casing, by means also of annular shoulders 38, 39 provided on the collars 36, 37 and finally by means of a helical spring 18 which is placed round the stationary shaft 12 and which bears at one end against the ball-bearing 13 which is mounted on the side remote from the fan casing 2 and at the other end against a split washer 19 which is inserted within a groove of the stationary shaft 12.

A circular cover 21 which tightly seals off the central opening formed by the inner impeller flange 5 serves to protect the ball-bearings 13 against any undesirable admission of dust.

The fan in accordance with the invention provides the following main advantages:

Elimination of the bearing-holder tube which was usually employed up to the present time together with delicate and costly ball-bearings and of the small-diameter shaft which was contained within the tube;

A substantial increase in cross-sectional area of the magnetic circuit of the rotor inasmuch as the bore diameter of this latter is only slightly larger than the diameter of the stationary shaft 12, thereby resulting in a lower degree of heating of the iron and in enhanced performance;

Increase in cross-sectional area and ruggedness of the stationary shaft 12 on which the rotor 11 of the motor 6 and the impeller 3 are mounted in overhung position;

Increase in size of ball-bearings, the cost price of which is accordingly reduced and which also provide substantially greater strength, lubricant capacity and length of service;

Greater ease of alignment of bearings and of centering of the rotor by reason of the clearance provided between the metallic annular bushings 15 and the outer bearing-rings 14, said clearance being finally filled by polymerization of the synthetic adhesive which is introduced between adjacent collars and rings. Any machining of the short-circuit collars is consequently rendered unnecessary.

As will be readily understood, it would be possible without departing from the purview of this invention to contemplate any structural modifications which would serve to facilitate the assembly of the different components and to reduce the time of assembly of the complete fan.

It would thus remain within the scope of the invention to dispense with the metallic annular bushings 15, the outer bearing-rings 14 being secured directly to the internal faces of the collars 36, 37 by means of the adhesive referred to above.

I claim:

1. An electrical axial fan of the flat type primarily intended for cooling electrical appliances and comprising a casing, a squirrel-cage induction motor housed within said casing, said motor comprising a stator and a rotor having a magnetic annular circuit and a non-magnetic cage associated with said circuit, said cage comprising two short-circuit collars, said rotor being rotatably mounted about a shaft fitted in said casing by means of ball bearings, and a fan impeller housed within said casing and carried by said rotor, wherein said short-circuit collars laterally project from said rotor magnetic circuit on each side thereof, said ball bearings are coaxially mounted between said shaft and said laterally projecting collars, and means are provided for bonding said ball bearings to said collars, said means comprising an adhesive layer interposed therebetween.

2. A fan in accordance with claim 1, wherein metallic annular bushings are fitted within the projecting portions of said collars and are interposed between said collars and said ball bearings.

3. A fan in accordance with claim 2, wherein said ball bearings are centered on said casing shaft and said adhesive layer fills any residual space between the outer rings of said ball bearings and the internal surfaces of said annular bushings.

4. A fan in accordance with claim 1, wherein said adhesive layer is made of a cured synthetic resin which polymerizes only out of contact with air.

5. A fan in accordance with claim 1, wherein the rotor core extends radially to the immediate vicinity of said shaft but without contact therewith.

6. In an electrical axial fan of the flat type, comprising a casing, and a squirrel-cage induction motor housed within the casing, said motor comprising a stator and a rotor having a magnetic annular circuit and a non-magnetic cage associated with said circuit, said cage comprising two short-circuit collars extending in opposite axial directions from the magnetic annular circuit of the rotor, said rotor being rotatably mounted on a shaft fitted in said casing by means of ball bearings, and a fan impeller housed within said casing and carried by said rotor; the improvement in which said magnetic annular circuit of said rotor extends radially inwardly beyond the radially outer portions of said ball bearings, said ball bearings being disposed on opposite axial sides of said magnetic annular circuit.

7. A fan as claimed in claim 6, said magnetic annular circuit being disposed on the radially inner side of said cage.

8. A fan as claimed in claim 6, said cage having radially inwardly extending annular flanges thereon disposed on axially opposite sides of said magnetic annular circuit and disposed between said magnetic annular circuit and said ball bearings.

References Cited

UNITED STATES PATENTS

| | | | |
|---|---|---|---|
| 1,861,608 | 6/1932 | Persons | 230—117X |
| 3,276,675 | 10/1966 | Saretzky | 230—117 |

ROBERT M. WALKER, Primary Examiner